Patented Oct. 5, 1954

2,691,017

UNITED STATES PATENT OFFICE 2,691,017

BIS-AMINOALKYL CARBONATE DERIVATIVES

Clinton A. Dornfeld, Mundelein, Ill., assignor to G. D. Searle & Co., Chicago, Ill., a corporation of Illinois No Drawing. Application October 25, 1952,
Serial No. 316,937

12 Claims. (Cl. 260—247.2)

The present invention relates to a new group of diesters of carbonic acid and, more particularly, to the bis-aminoalkyl carbonate derivatives of the structural formula $$R_2N-Alk-O-CO-O-Alk-NR_2$$

and their salts wherein Alk is a lower alkylene radical and $NR_2$ is a lower monoalkylamino radical, dialkylamino radical or a nitrogen-containing heterocyclic radical attached through the cyclic nitrogen to the radical Alk.

In the foregoing structural formula Alk represents a lower alkylene radical containing at least two carbon atoms between the oxygen and amine linkages. Such alkylene radicals may be derived from straight-chained and branch-chained hydrocarbons as ethylene, propylene, butylene, amylene, hexylene or polymethylenes such as trimethylene, tetramethylene, pentamethylene and hexamethylene. The amino radical $NR_2$ is an aliphatic-type organic amino radical such as a lower monoalkylamino radical or dialkylamino radical wherein the alkyl substituents can be methyl, ethyl, straight and branch-chained propyl, butyl, amyl and hexyl. The amino radical can also be a heterocyclic radical such as morpholino, thiamorpholino, piperazino and the like; of special interest are radicals of the type

wherein A is a lower alkylene radical containing more than three and less than six carbon atoms in nuclear position, as in the case of the pyrrolidino, piperidino, 2,5-di-methylpyrrolidino and lupetidino radicals.

The organic bases of the foregoing type form salts, non-toxic in therapeutic dosage, with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The compounds which constitute this invention have been found to be valuable medicinal agents. Thus the acid addition salts have demonstrated considerable potency in correcting pathological cardiac irregularity. The quaternary ammonium salts have proven to be potent inhibitors for the transmission of automic nerve impulses through the ganglia. Further, these quaternary ammonium compounds have shown valuable cardiovascular properties in producing hypotensive effects and in dilating peripheral blood vessels. Further utility for the quaternary ammonium compounds can be found in their employment in parasiticidal compositions of matter.

Aside from this intrinsic value of these carbonates in medicinal chemistry, they are also of value as intermediates in the synthesis of more complex organic structures of value to medicinal chemistry. Thus I have found that these carbonates react with the hydroaromatic carbon atoms of certain cyclic organic molecules to form basically substituted carbalkoxylates. The following equation illustrates the process of preparing the compound represented in the last of the examples below.

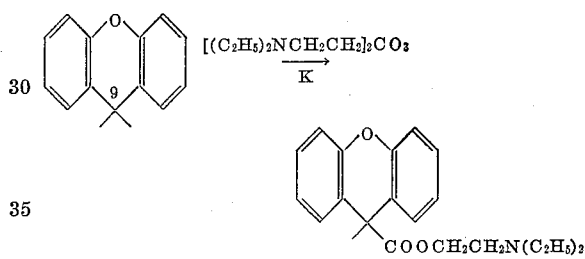

The —COO—Alkylene—N(alkyl)$_2$ radical can also be added to other hydroaromatic carbon atoms such as the carbons in the 9-position of fluorene, dihydroanthracene, dihydrophenanthrene and the like.

The following examples illustrate in detail certain of the compounds which comprise this invention and methods for their production. However, the invention is not to be construed as limited thereby in spirit or in scope. It will be apparent to those skilled in the art that many modifications in materials and methods may be made without departing from the invention. In each of these examples temperatures are given in degrees centigrade (° C.), relative amounts of material in parts by weight and pressures in millimeters (mm.) of mercury.

EXAMPLE 1

Bis(β-dimethylaminoethyl) carbonate

A mixture of 370 parts of diethyl carbonate, 430 parts of β-dimethylaminoethanol and 14 parts of anhydrous potassium carbonate is heated with stirring until the reaction mixture attains a temperature of about 116° C. This temperature is gradually raised to 150° C. in the course of 10 hours during which period the ethanol generated is distilled off. Then other low boiling constituents are distilled off at atmospheric pressure and the residue is filtered. The filtrate is distilled twice at 7 mm. pressure. The fraction boiling at about 111° C. at that pressure consists of bis(β-dimethylaminoethyl) carbonate which has the structural formula (CH₃)₂N—CH₂—CH₂—O—CO—O—CH₂—CH₂—N(CH₃)₂

EXAMPLE 2

Dimethobromide of bis(β-dimethylaminoethyl) carbonate

A solution of 204 parts of bis(β-dimethylaminoethyl) carbonate and 190 parts of methyl bromide in 1500 parts of chloroform is heated at 70° C. for 15 hours in a shielded pressure reactor. After cooling the precipitate is washed on a filter with dry ether. After vacuum drying at 100° C. the resulting dimethobromide melts at about 212–213° C. It has the structural formula

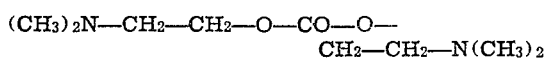

EXAMPLE 3

Bis(β-diethylaminoethyl) carbonate

A mixture of 430 parts of diethyl carbonate, 702 parts of β-diethylaminoethanol and 0.3 parts of anhydrous potassium carbonate is stirred and heated gradually until the reaction mixture reaches a temperature of about 125° C. It is maintained at that temperature for about 5 hours. In the course of this process the ethanol generated is distilled off. Heating at a distillation temperature is continued for several hours after which the reaction mixture is submitted to vacuum distillation. Upon repeated fractionation the bis(β-diethylaminoethyl) carbonate is obtained at about 112–116° C. and 0.25 mm. pressure.

EXAMPLE 4

Dihydrochloride of bis(β-diethylaminoethyl) carbonate

To a cooled solution of 260 parts of bis(β-diethylaminoethyl) carbonate in 700 parts of anhydrous ether, a solution of 82.5 parts of hydrogen chloride in 260 parts of 2-propanol and 700 parts of ether is added. After cooling and stirring at 0° C. the crystalline dihydrochloride forms. The precipitate is filtered off, washed with ether and dried in vacuum at 75° C. It has the structural formula HCl.(C₂H₅)₂N—CH₂—CH₂—O—CO—O—CH₂—CH₂—N(C₂H₅)₂.HCl

EXAMPLE 5

Diethobromide of bis(β-diethylaminoethyl) carbonate

A mixture of 260 parts of bis(β-diethylaminoethyl) carbonate and 284 parts of ethyl bromide is heated in a shielded pressure reactor at 90° C. for 16 hours. The resulting precipitate is washed with petroleum ether, collected on a filter, recrystallized from hot 2-propanol, and dried in vacuum at 74° C. The white crystals have the structural formula

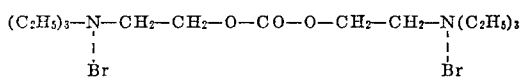

EXAMPLE 6

Bis(δ-dimethylaminobutyl) carbonate

A mixture of 143 parts of diethyl carbonate, 240 parts of δ-dimethylaminobutanol and 0.1 part of anhydrous potassium carbonate is slowly heated and stirred as in Example 1 with evaporation of the ethanol formed during the reaction. The resulting bis(δ-dimethylaminobutyl) carbonate is collected by fractionation at about 116–122° C. and 0.2–0.22 mm. pressure.

EXAMPLE 7

Bis-piperidinoethyl carbonate

A mixture of 485 parts of diethyl carbonate, 900 parts of N-(β-hydroxyethyl)piperidine and 0.4 part of anhydrous potassium carbonate is stirred and heated as in Example 1 with distillation of the ethanol formed in the reaction. The resulting bis-piperidinoethyl carbonate is collected on fractionation at about 137–144° C. and 0.2–0.3 mm. pressure. It has the structural formula

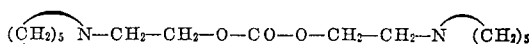

EXAMPLE 8

Bis-morpholinoethyl carbonate

A mixture of 430 parts of diethyl carbonate, 520 parts of N-(β-hydroxyethyl)morpholine and 0.3 parts of potassium carbonate is heated and distilled as in Example 1 to yield the bis-morpholinoethyl carbonate, which is collected by vacuum distillation at 160–169° C. and 0.2–0.3 mm. pressure. It has the structural formula

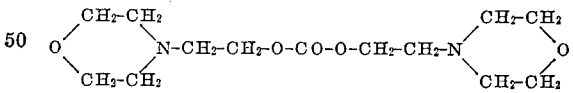

EXAMPLE 9

β-Diethylaminoethyl ester of xanthene-9-carboxylic acid

To a stirred solution of 364 parts of xanthene and 1040 parts of bis(β-diethylaminoethyl) carbonate, 80 parts of potassium are added under nitrogen in the course of 75 minutes while the temperature is caused to rise from about 60 to 106° C. Stirring at about 100° C. is continued for about 4 hours, after which the mixture is permitted to stand at room temperature for 12 hours. After addition of ethanol and water the organic layer is separated and extracted with ether. The ether solution is dried, evaporated and distilled at about 55–123° C. and 0.4 mm. pressure. The residue is taken up in dry ether and treated with an excess of hydrogen chloride in 2-propanol to yield the hydrochloride of β-diethylaminoethyl ester of xanthene-9-carboxylic acid which melts at about 159–160° C.

I claim:
1. A member of the group of new organic com- pounds consisting of the bases of the structural formula

R$_2$N—Alk—O—CO—O—Alk—NR$_2$ and their non-toxic salts, wherein Alk is a lower alkylene radical containing at least two carbon atoms and NR$_2$ is a member of the class consisting of lower dialkylamino radicals, morpholino radicals and radicals of the type

wherein A is a lower alkylene radical containing more than three and less than six carbon atoms in nuclear position.

2. The lower bis(dialkylaminoalkyl) carbonates of the structural formula (lower alkyl)$_2$N—Alk—O—CO—O—Alk—N(lower alkyl)$_2$ wherein Alk is a lower alkylene radical containing at least two carbon atoms.

3. The lower bis($\beta$-dialkylaminoethyl) carbonates.

4. Bis($\beta$-dimethylaminoethyl) carbonate.

5. Bis($\beta$-diethylaminoethyl) carbonate.

6. The lower bis-piperidinoalkyl carbonates of the structural formula

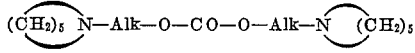

wherein Alk is a lower alkylene radical containing at least two carbon atoms.

7. Bis-piperidinoethyl carbonate.

8. The lower bis(morpholinoalkyl) carbonates of the structural formula

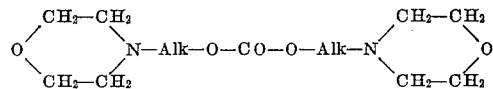

wherein Alk is a lower alkylene radical containing at least two carbon atoms.

9. Bis-morpholinoethyl carbonate.

10. The quaternary salts of the structural formula

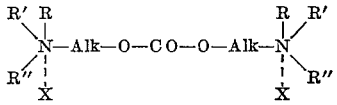

wherein Alk is a lower alkylene radical containing at least two carbon atoms, R, R' and R'' are lower alkyl radicals and X is a non-toxic anion.

11. The lower alkyl halides of the lower bis-($\beta$-dialkylaminoethyl) carbonates.

12. The quaternary salts of the structural formula

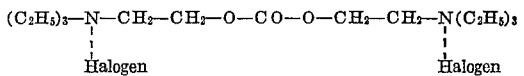

References Cited in the file of this patent

UNITED STATES PATENTS

| Number | Name | Date |
|--------|------|------|
| 2,380,130 | Valentine | July 10, 1945 |
| 2,384,608 | De Groote et al. | Sept. 11, 1945 |
| 2,399,118 | Homeyer | Apr. 23, 1946 |